(12) United States Patent
Matsuoka et al.

(10) Patent No.: US 7,991,248 B2
(45) Date of Patent: Aug. 2, 2011

(54) OPTICAL WAVEGUIDE SUBSTRATE AND SUBSTRATE MOUNTING PHOTOELECTRIC HYBRID CIRCUIT

(75) Inventors: Yasunobu Matsuoka, Hachioji (JP); Masato Shishikura, Ome (JP)

(73) Assignee: Hitachi Chemical Co., Ltd., Tokyo (JP)

(*) Notice: Subject to any disclaimer, the term of this patent is extended or adjusted under 35 U.S.C. 154(b) by 308 days.

(21) Appl. No.: 12/438,065

(22) PCT Filed: Feb. 22, 2007

(86) PCT No.: PCT/JP2007/053307
§ 371 (c)(1), (2), (4) Date: Feb. 19, 2009

(87) PCT Pub. No.: WO2008/035466
PCT Pub. Date: Mar. 27, 2008

(65) Prior Publication Data
US 2010/0166363 A1 Jul. 1, 2010

(30) Foreign Application Priority Data

Sep. 21, 2006 (JP) ................................. 2006-255984

(51) Int. Cl.
*G02B 6/12* (2006.01)
(52) U.S. Cl. ............ 385/14; 385/50; 385/129; 385/131; 385/132; 385/43
(58) Field of Classification Search .................... 385/14, 385/43, 129, 131, 132, 50
See application file for complete search history.

(56) References Cited

U.S. PATENT DOCUMENTS

| 7,139,448 B2 * | 11/2006 | Jain et al. ........................ 385/14 |
| 7,680,367 B2 | 3/2010 | Matsuoka et al. |
| 2002/0097962 A1 * | 7/2002 | Yoshimura et al. ............. 385/50 |
| 2007/0215790 A1 | 9/2007 | Ohtorii |
| 2009/0003761 A1 | 1/2009 | Matsuoka et al. |

FOREIGN PATENT DOCUMENTS

| JP | 2003-114365 | 4/2003 |
| JP | 2005-340545 | 12/2005 |
| JP | 2007-156114 | 6/2007 |

* cited by examiner

*Primary Examiner* — Hemang Sanghavi
(74) *Attorney, Agent, or Firm* — Mattingly & Malur, PC

(57) ABSTRACT

There are provided a substrate mounted with a photoelectric hybrid circuit having an optical path conversion mirror structure and optical waveguide wiring by reducing the number of parts and the number of fabrication steps, as well as most effectively implement high-density wiring for an optical connection between the optical waveguide and the photoelectric conversion element or optical waveguide array connector that are formed on the substrate, and a device. An optical waveguide layer 12 stacked on a substrate 10 and formed of a wiring core surrounded by a clad layer 11, and cores 15, 16 having tapered surfaces intersecting the respective wiring cores 13, 14 of the optical waveguide layer 12 perpendicularly are arranged, the tapered surfaces 15*a*, 16*a* of the cores 15, 16 having tapered surfaces are buried respectively in the wiring portion cores intersecting perpendicularly, and a first core 13 for turning the optical path of light propagating through the wiring portion core at the first core 15 with a tapered surface, and a second core 14 for turning the optical path of light passed through the first core 15 with a tapered surface at the second core 16 with a tapered surface are arranged alternately.

22 Claims, 12 Drawing Sheets

OPTICAL WAVEGUIDE SUBSTRATE AND SUBSTRATE MOUNTING PHOTOELECTRIC HYBRID CIRCUIT

TECHNICAL FIELD

The present invention relates to an optical waveguide substrate and a substrate mounting a photoelectric hybrid circuit, and particularly to a method of mounting an optical wiring structure and an optical connection unit that are included in a photoelectric hybrid circuit mounting substrate, which batch process huge amounts of optical signals transmitted and received between boards in a transmission device.

BACKGROUND ART

In recent years, communication traffic upgrade has been swiftly made to exchange huge amounts of data at high speed by using light in the information communication area. Currently, long-haul fiber optic networks, such as backbone, metro, and access networks, spread over a relatively long distance that reaches a few kilometers or more. Further, existing signal lines are being replaced with fiber-optic lines in order to process huge amount of data without delay even for a very short distance between transmission devices (several meters to several hundred meters) or between devices (several centimeters to several ten centimeters).

High frequency signals, such as Ethernet are inputted to a line card through an optic fiber from the outside for fiber-optic wiring in a transmission device, for example, such as a router/switch device. A few line cards are provided for a single back plane, so that signals, each of which is inputted to each line card, are gathered into a switch card and then processed by an LSI included in the switch card, and then outputted to the respective line cards through the back plane. For the conventional devices, signals having a data rate of more than 300 Gbit/s are gathered from the respective line cards through the back plane to the switch card. The transmission of these signals through conventional electrical lines requires each electrical line to be responsible for data rate of 1 to 3 Gbit/s, and thus 100 or more electrical lines are needed.

Subsequently, a waveform shaping circuit or measures against reflection or cross talk between the lines are needed for such high frequency lines. As the system is developed to process huge amount of information, for example, of more than several terabits/sec, problems with the number of lines or measures against cross talk become more serious in the conventional electrical lines. To resolve these problems, there is highlighted a method of implementing signal transmission lines between the boards, for example, such as between the line card and the back plane, and between the back plane and the switch card with optical fibers. This method allows for low-loss transmission of high frequency signals whose data rate reaches more than 10 Gbps. Therefore, the number of lines is reduced and the above measures are not necessary even for high frequency signals, so that this method is considered promising.

Figure 10:
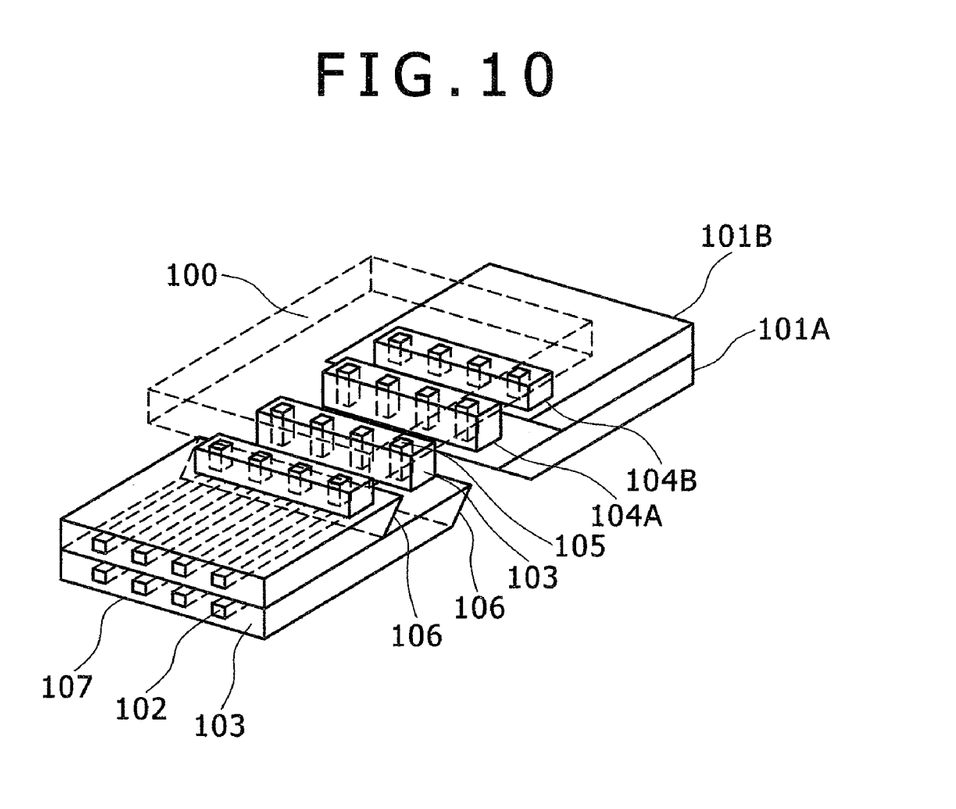
FIG. 10 is a view illustrating the conventional mounting example of a high-density optical connection between the multi-layer optical waveguide array and the photoelectric conversion element array.

Higher-density optical wiring and substrate mounting technologies including easy production methods are necessary to implement these high-capacity optical interconnection circuits. Patent Document 1 discloses an example of mounting a high-density optical connection of a multi-layer optical waveguide array and a photoelectric conversion element array with respect to high-density wiring, which is shown in FIG. 10. In this example, the optical wiring layers 101A and 101B, such as a plurality of optical waveguide arrays arranged two-dimensionally are stacked one above the other in the thickness direction of the substrate and connected to the surface light emitting (receiving)-type photoelectric conversion element array 100 mounted on a substrate surface, and this allows for high-density wiring with a reduced mounting area. Further, the mirror parts 106 for turning the optical path of light propagating through the optical waveguide array in the direction perpendicular to the substrate may be formed by bringing together the plurality of cores through a cutting process while the ends of the optical waveguide arrays 101A and 101B are arranged in the same column, and thus fabrication process is simplified.

Figure 11A:
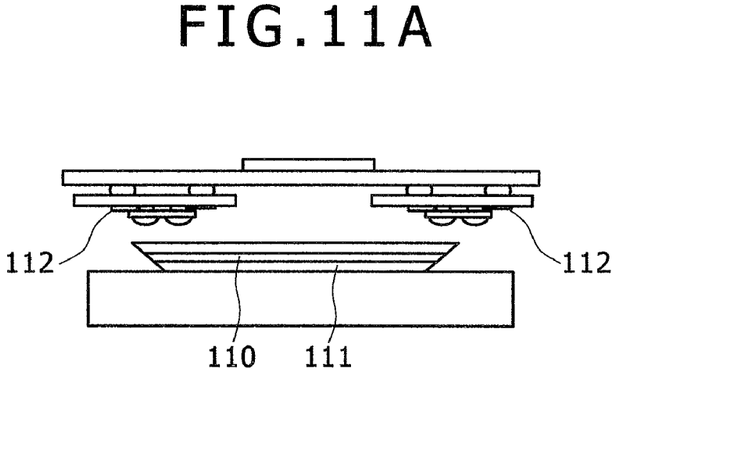
FIGS. 11A, 11B and 11C are views illustrating the conventional mounting example of a high-density optical connection between the optical wiring layer and the photoelectric conversion element array in the same layer.
Figure 11B:
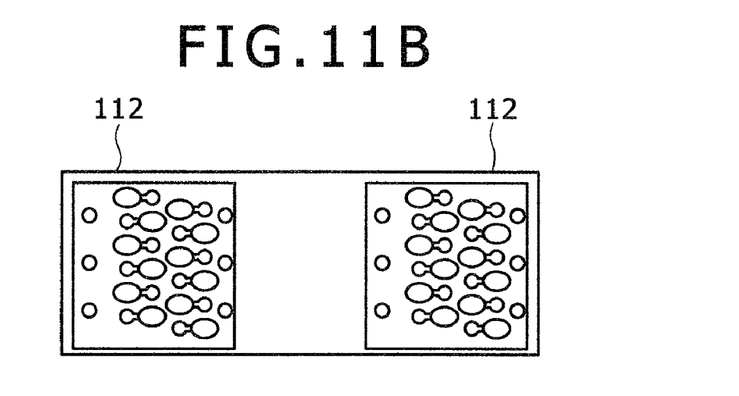
Figure 11C:
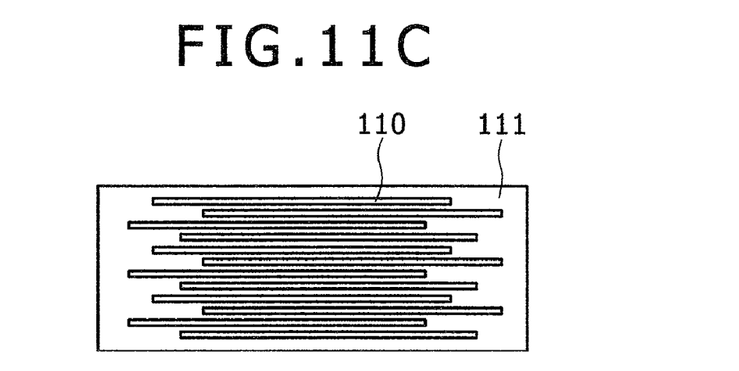

Patent Document 2 discloses another example of a high-density optical connection between an optical wiring layer and a photoelectric conversion element array, which is shown in FIG. 11A-C. In this example, the light inlet/outlet ends of the adjacent optical waveguide cores 110, which may be in plural, are arranged to deviate from the waveguide direction of the light. Similarly, the photoelectric conversion element arrays 112, which are positioned to correspond to the light inlet/outlet ends of the cores, are also arranged to deviate from the waveguide direction, and optically connect to the optical waveguide cores 110. This may reduce the influence of cross talk between the adjacent cores or adjacent photoelectric conversion elements and further improve the integration density of the optical wiring and the photoelectric conversion element.

Patent document 1: Japanese Patent Application Publication No. 2003-114365.
Patent document 2: Japanese Patent Application Publication No. 2005-340545.

DISCLOSURE OF THE INVENTION

Problems to be Solved by the Invention

It is desirable to make the pitch narrow between the channels of the photoelectric conversion element array and the optical waveguide array while taking into consideration of density of the area for the optical connection between the multi-layer optical waveguide array and the photoelectric conversion array that are disclosed in the Patent Document 1. In a case where the pitch is made too narrow, however, influences such as cross talk may take place between the neighboring cores or between the neighboring photoelectric conversion elements, and consequently, narrowing the pitch is also limited in the same structure. Further, high density may be achieved by increasing the number of layers of the optical waveguide arrays, however, this may make increase the physical distance between the optical waveguide and the photoelectric conversion element. Therefore, in order to suppress optical connection loss caused by beam diffusion as disclosed in Patent Document 1, the component needs to be reconfigured. This causes an increase in the number of parts or the number of fabrication steps, and reduces the overall production of the products. Therefore, increasing the number of layers is also restricted.

Meanwhile, the respective optical lines and the photoelectric conversion elements are arranged in a zigzag manner on the same layer for high-density wiring, however, it is impossible to form the optical path conversion mirrors of the optical waveguide cores by bringing together the plurality of cores to perform a cutting process as described above. Therefore, it is necessary to produce each and every mirror for the end of each and every core arranged to deviate from another, and this leads to the increase in the number of parts and reduces the yield. Furthermore, the same problems still occur even though the optical waveguides are arranged in a plover type, even in the case of a method of mounting on the optical waveguide the micro prism mirrors that are separately produced beforehand besides the cutting process.

Figure 9:
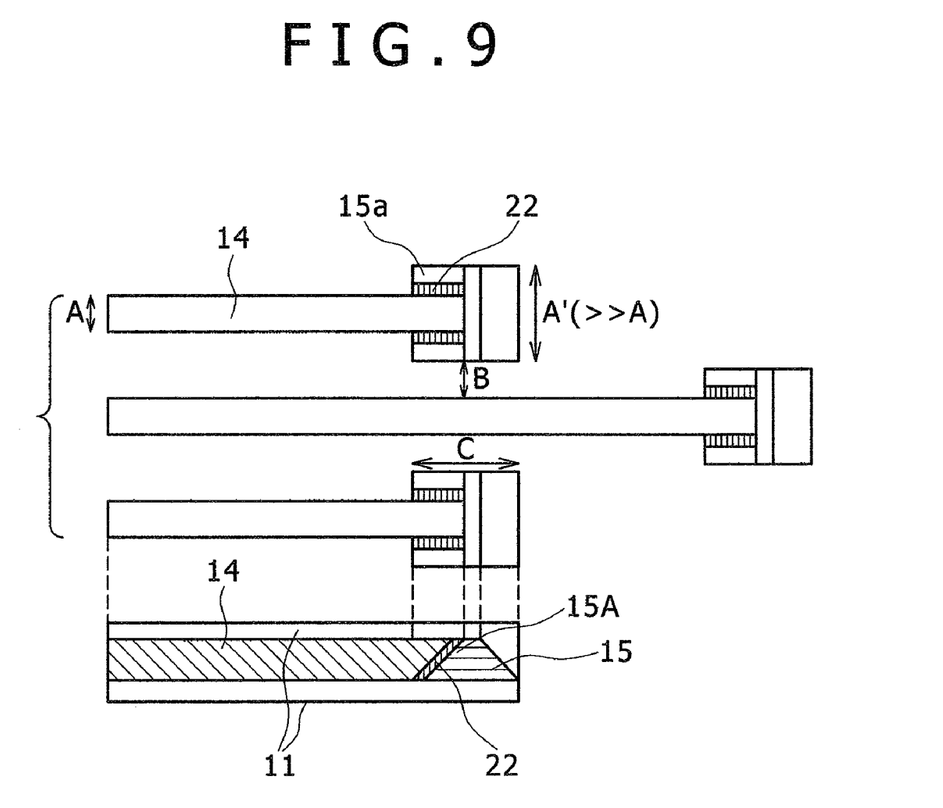
FIG. 9 is a view illustrating problems with the structure of the wiring cores in a plover type arrangement and the optical path conversion mirrors, each prepared at each of the wiring cores.

There is suggested still another method of forming at one time the mirrors of the optical waveguides that are arranged in a plover type on the surface by lithography using a mask. However, this method has a difficulty in forming the mirrors sloped at 45 degrees precisely and uniformly on the surface in order to illuminate light into the core. And, structural problems may occur as well, which is described with reference to FIG. 9. In a case where the core 15 with a tapered surface and the wiring core 14 are separately patterned as shown in FIG. 9, the width of the core 15 with the tapered surface, which is denoted by reference character A' in FIG. 9, is required to be sufficiently larger than the width A of the core while taking into consideration of the arrangement deviation, and this is disadvantageous in order to implement a narrow pitch. Further, a cavity may be created when the core 14 and the core 15 with the tapered surface are buried into the clad 11 due to approaching space B between the wiring core and the core with the tapered surface, and this may reduce the yield.

Accordingly, an object of the present invention is to provide a substrate mounted with a photoelectric hybrid circuit having an optical path conversion mirror structure and optical waveguide wiring by reducing the number of parts and the number of fabrication steps to save costs, as well as most effectively implement high-density wiring for an optical connection between the optical waveguide and the photoelectric conversion element or optical waveguide array connector that are formed on the substrate, and a device using the substrate mounted with the photoelectric hybrid circuit.

Means for Solving the Problems

To solve the above problems, the present invention provides cores with tapered surfaces, which are arranged on a substrate to be perpendicular to a plurality of wiring cores and serve to turn the optical path 90 degrees at locations corresponding to optical elements with respect to the vertical axis of the substrate. That is, light emitted from elements arranged on the optical waveguide, for example, light emitting elements, turns its optical path at 90 degrees by the core with the tapered surface and then propagates through the wiring core. The propagating light turns its optical path at 90 degrees by another core with a tapered surface, which is arranged at another location, to be directed toward the top surface of the optical waveguide, and then received into elements arranged on the optical waveguide, for example, light receiving diodes. At this time, the tapered surface of the core with the tapered surface is buried in the wiring core perpendicular to the core with the tapered surface in the present invention. And, the first core in which the propagating light turns its optical path using the first core with the tapered surface and the second core whose optical path passes through the first core with the tapered surface and is turned by the second core with the tapered surface are arranged alternately to each other, and therefore, the transmission and receipt of light may be performed between the plurality of wiring cores densely arranged and the optical element arrays through parts having common mirror functions.

Effects of the Invention

According to the present invention, there may be provided a substrate mounting a photoelectric hybrid circuit that has an optical path conversion mirror structure and optical waveguide wiring that may reduce the number of parts and the number of fabrication steps to save the costs, as well as most effectively implement high-density wiring in an optical connection between the optical waveguide and the photoelectric conversion element or optical waveguide array connector that are formed on the substrate, and a device using the substrate mounting the photoelectric hybrid circuit.

BEST MODE FOR CARRYING OUT THE INVENTION

Hereinafter, embodiments will be described in detail.

First Embodiment

Figure 1A:
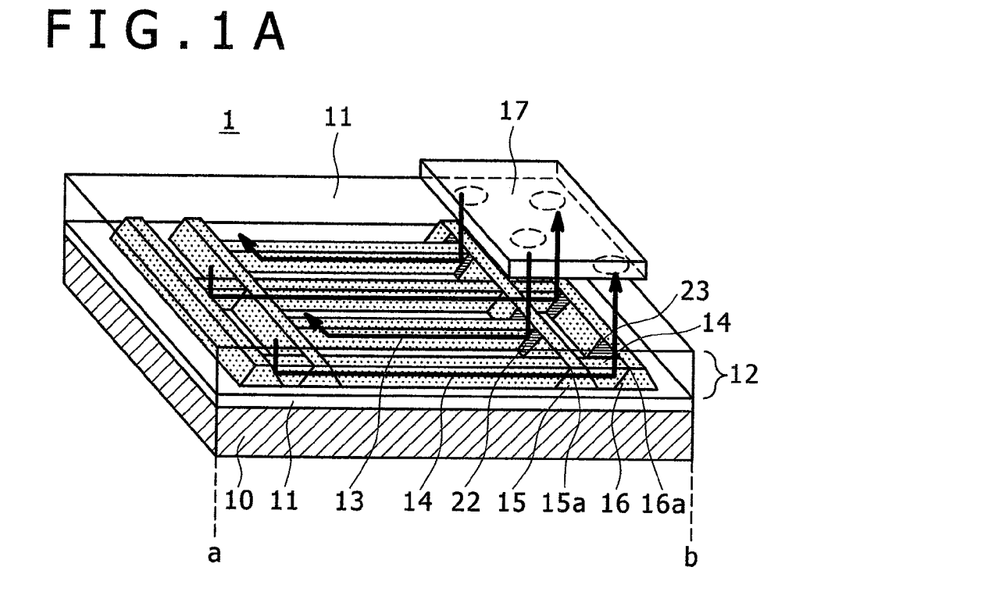
FIGS. 1A and 1B are a perspective view and a plan view respectively illustrating a photoelectric hybrid circuit-mounted substrate according to a first embodiment of the present invention.
Figure 1B:
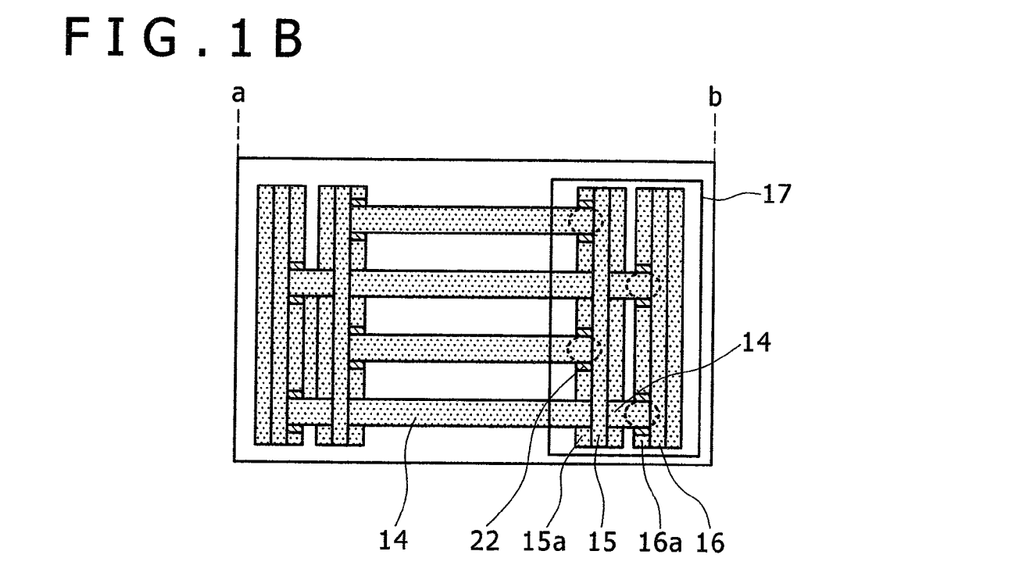

FIGS. 1A and 1B are a perspective view and a plan view respectively illustrating a photoelectric hybrid circuit-mounted substrate 1 according to a first embodiment of the present invention. Reference numeral 10 refers to a substrate made of a material such as glass epoxy, ceramic, or semiconductor. An optical waveguide layer 12 and cores 15 and 16 are stacked on the substrate 10. The optical waveguide layer 12 has a plurality of wiring cores 13 and 14 therein, each of which is surrounded by a clad layer 11 and made of a material with a high refractive index. Cores 15 and 16 have tapered surfaces 15a and 16a, respectively, which intersect the wiring cores 13 and 14 on the substrate.

Optical reflecting films 22 and 23 are provided anywhere on the tapered surfaces 15a and 16a of the cores 15 and 16 with tapered surfaces, respectively. Further, the tapered surfaces 15a and 16a are buried in the intersecting wiring cores 13 and 14, respectively. That is, the first wiring core 13 whose optical path is turned by the tapered surface 15a of the first core 15 with the tapered surface and the second wiring core 14 whose optical path passes through the first core 15 with the tapered surface to the tapered surface 16a of the second core 16 with the tapered surface are arranged alternately to each other in a zigzag manner on the substrate as shown in FIG. 1A,B. Respective optical element arrays 17 are positioned on the optical waveguide layer 12 to correspond to the tapered surfaces 15a and 16a of the cores 15 and 16 with the tapered surfaces so that the transmission and receipt of light between the wiring cores 13 and 14 and the optical element arrays 17 are achieved through the cores 15 and 16 with the tapered surfaces. Although a plover type arrangement is shown in FIG. 1A,B as an example, the wiring cores 13 and 14 may be optically connected to the optical element arrays 17 through the respective cores 15 and 16 with the tapered surfaces, which have the common mirror functions, with high density in the same area. In addition, electrical wiring necessary (not shown) for the optical element arrays 17 are patterned on the mounting substrate 1. The electrical wiring is patterned by a lithography technology similarly to the wiring cores 13 and 14, the cores 15 and 16 with the tapered surfaces, or the optical reflecting films 22 and 23 while being positioned, and electrically connected to the optical element arrays 17 and a light receiving element 28 that are positioned at a predetermined location. Further, the optical element arrays 17 used herein may be surface emitting laser diodes or surface receiving photo diodes that are very suitable for surface mounting by a flip chip. Further, other optical element arrays (not shown) may be positioned on the surfaces of the cores 70 and 71 with the tapered surfaces to the optical element arrays 17 positioned on the substrate, so that signals may be communicated between the optical element arrays through the wiring cores 13 and 14 and the cores 70 and 71 with the tapered surfaces.

Here, the primary parts included in the photoelectric hybrid circuit-mounted substrate 1 shown in FIG. 1A,B have the following size. Each of the wiring cores 13 and 14 has a cross section of 50 μm×50 μm perpendicularly to the length of the wiring cores 13 and 14, an gap between the core 13 and the core 14 (distance between the center of the core 13 and the center of the core 14) is 125 μm, and the clad of the optical waveguide layer 12 is 25 μm thick in the vertical direction. The interval between the cores with the tapered surfaces is 250 μm, and the optical reflecting films 22 and 23 formed on the respective tapered surfaces are alternately arranged with a pitch of 125 μm. Here, the pitch between the wiring cores 13 and 14, and the pitch between the optical reflecting films 22 and 23 have been adapted to be 125 μm since the pitch is dependent on the diameter (125 μm) of the clad in a case where the optical element arrays 17 positioned on the substrate surface are made of fiber arrays. Further, it is also possible to adapt the pitch to be below 125 μm in a case where only the optical element arrays are arranged. In this case, however, it is necessary to determine the pitch while taking into consideration of the influence from the optical cross talk between the channels.

Figure 2A:
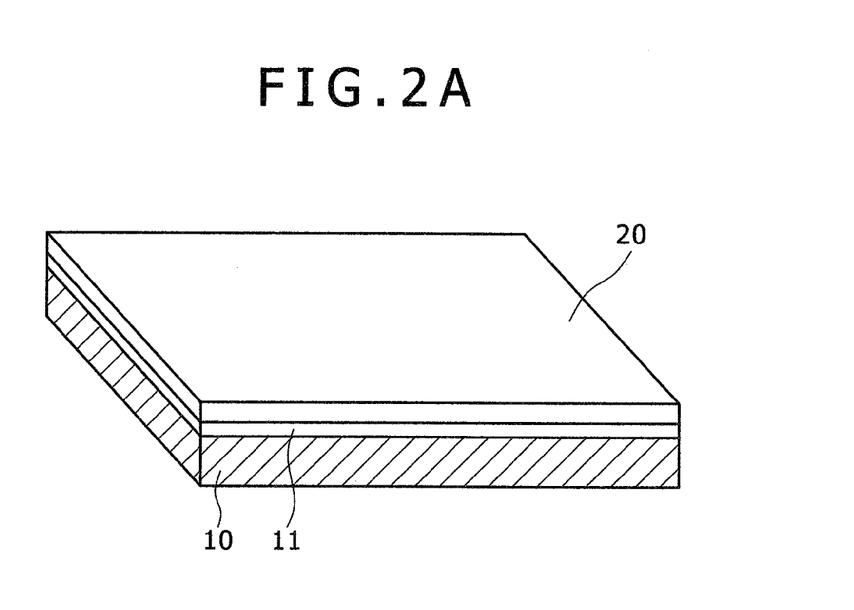
FIG. 2A is a view illustrating a state where a clad layer is formed on a substrate and a core layer having higher refractive index than that of the clad layer is formed on the clad layer.

FIGS. 2A to 2F are views illustrating an exemplary procedure of configuring the photoelectric hybrid circuit-mounted substrate shown in FIG. 1A,B according to the first embodiment. In FIG. 2A, the clad layer 11 is formed on the substrate 10 and then the core layer 20, which has the refractive index higher than that of the clad layer 25, is formed on the clad layer 11 by an applying or bonding process. Although a resin such as polymer which may be cured by ultraviolet rays and patterned by a photolithography process is employed as the material of the clad layer 11 and the core layer 20, another material such as a dielectric film or quartz may be adopted for the clad layer 11 and the core layer 20 in a case where other processes such as etching are performed. In addition, the clad layer 11 is adapted to be 30 μm thick and the core layer 20 to be 50 μm thick so as to correspond to the above-mentioned size.

Figure 2B:
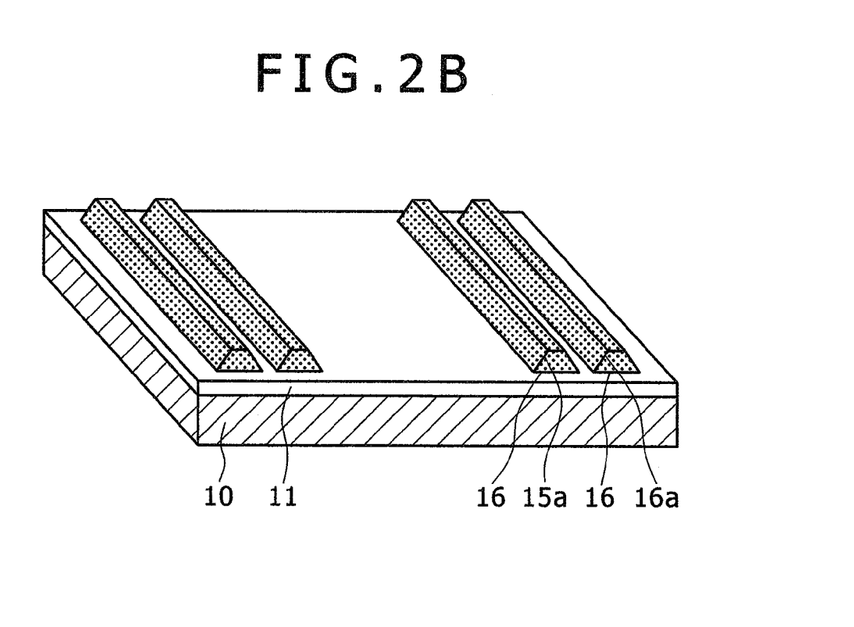
FIG. 2B is a view illustrating a state where a core layer is patterned on the surface of the clad layer and then cores with tapered surfaces are formed on the clad layer.
Figure 2C:
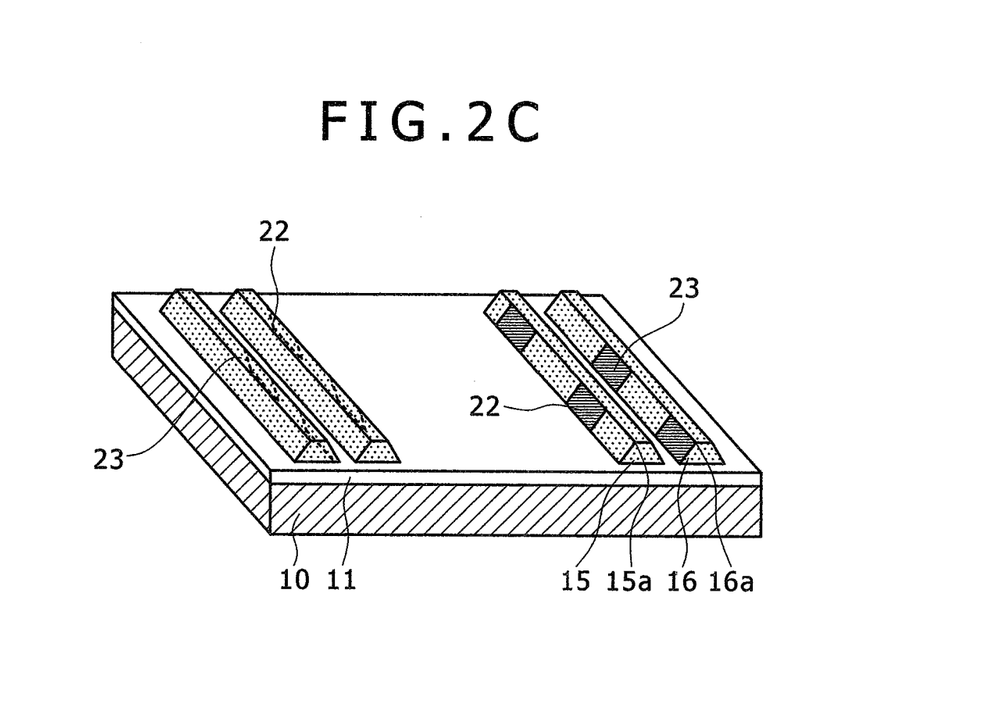
FIG. 2C is a view illustrating where a metal is applied on a part of the tapered surfaces of the cores with the tapered surfaces to efficiently reflect light.

Next, hexahedrons are patterned on the clad layer 11 by performing a photolithography process on the core layer 20, and then the cores 15 and 16 with the tapered surfaces 15a and 16a are formed by cutting the hexahedrons to prepare the tapered surfaces 15a and 16a as shown in FIG. 2B. Since the cores 15 and 16 with the tapered surfaces are connected to be perpendicular to the wiring cores 13 and 14, respectively, the tapered surfaces 15a and 16a may also be formed at the same time by using an etching process or inclined lithography in addition to the cutting process. This enables the number of fabrication steps to be sharply reduced. Further, a metal such as Au is applied on some parts of the tapered surfaces 15a and 16a of the cores 15 and 16 with the tapered surfaces by deposition or plating so as to reflect light with a high efficiency as shown in FIG. 2C.

Figure 2D:
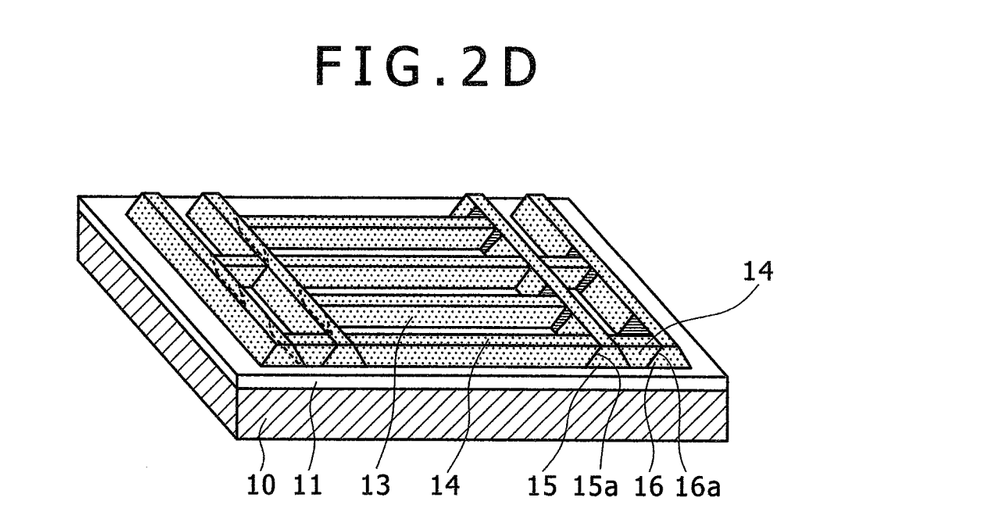
FIG. 2D is a view illustrating a state where a core layer is formed on the core with the tapered surface to form a core pattern.
Figure 2E:
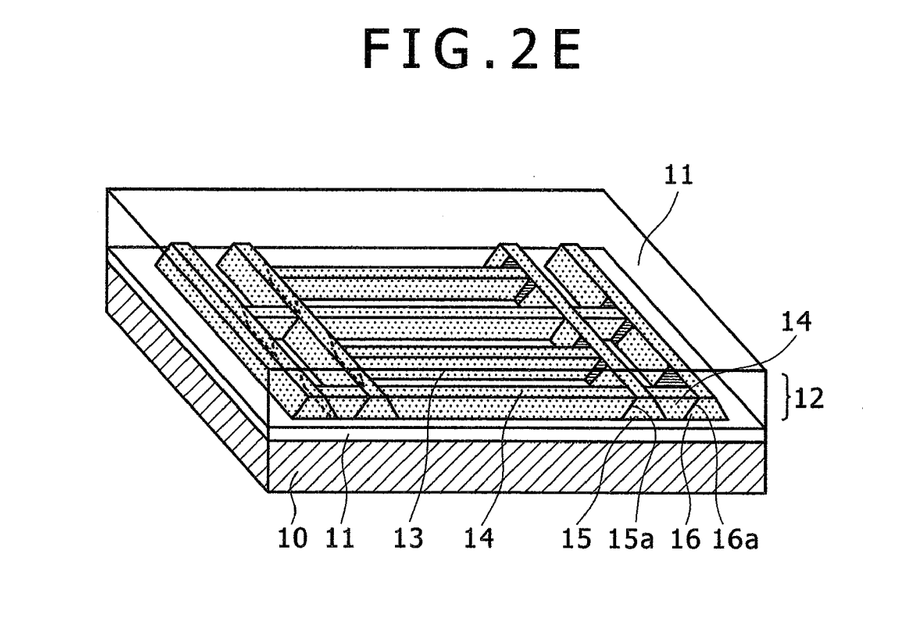
FIG. 2E is a view illustrating a state where a clad layer material is positioned on the patterned core.

Then, another core layer is formed on the cores 15 and 16 with the tapered surfaces by applying or bonding as shown in FIG. 2D similarly to the procedure described above with reference to FIG. 2A and then the cores 13 and 14 are patterned by photolithography. The tapered surfaces 15a and 16a of the cores 15 and 16 with the tapered surfaces, respectively, may be formed only on one surface of the cores 15 and 16 with the tapered surfaces, which intersects the patterned cores 13 and 14, however, preferably formed on both surfaces of the cores 15 and 16 with the tapered surfaces while taking into consideration of filling properties of the cores 13 and 14. In FIG. 2E, another clad layer 11 is positioned on the patterned cores 13 and 14. Here, the entire substrate 10 including the clad layer 11 is slightly heated to soften the clad layer 11, with the clad layer 11 being 80 μm thick. At the same time, the top surface of the clad layer 11 is pressurized by a pushing board having a flattened surface so that the clad layer 11 is filled in the space between the cores 13 and 14 to cover the cores 13 and 14, thus completing the optical waveguide layer 12.

Figure 2F:
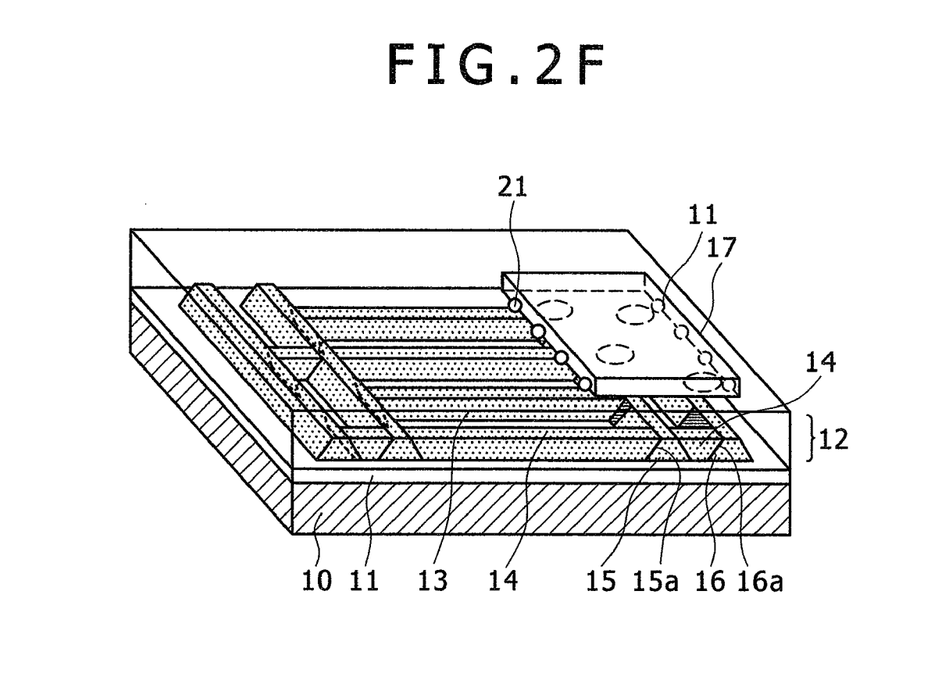
FIG. 2F is a view illustrating the last stage of completing the photoelectric hybrid circuit-mounted substrate shown in FIG. 1A,B.

FIG. 2F is a view illustrating a final step of completing the photoelectric hybrid circuit-mounted substrate 1 shown in FIG. 1A,B. Electrical wiring necessary for the optical element arrays 17 is patterned on the surface of the optical waveguide layer 12 by a lithography technology similarly to cores 15 and 16 with the tapered surfaces, while being positioned to correspond to the location of cores 15 and 16 with the tapered surfaces. Soldering bumps 21 and the optical element arrays 17 are positioned at predetermined locations of the electrical wiring for electrical connections. This completes the photoelectric hybrid circuit-mounted substrate 1 shown in FIG. 1A,B.

(Exemplary Quantitative Estimation in Effect of Present Invention)

Figure 3A:
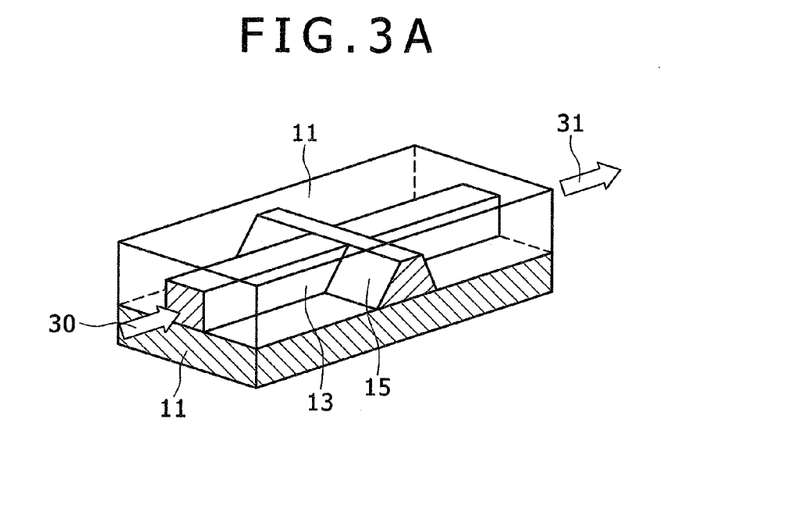
FIG. 3A is a view schematically illustrating an example in which light is incident onto one surface of the core arranged on the clad, passes through the core with the tapered surface, and then emitted from the other surface of the core.
Figure 3B:
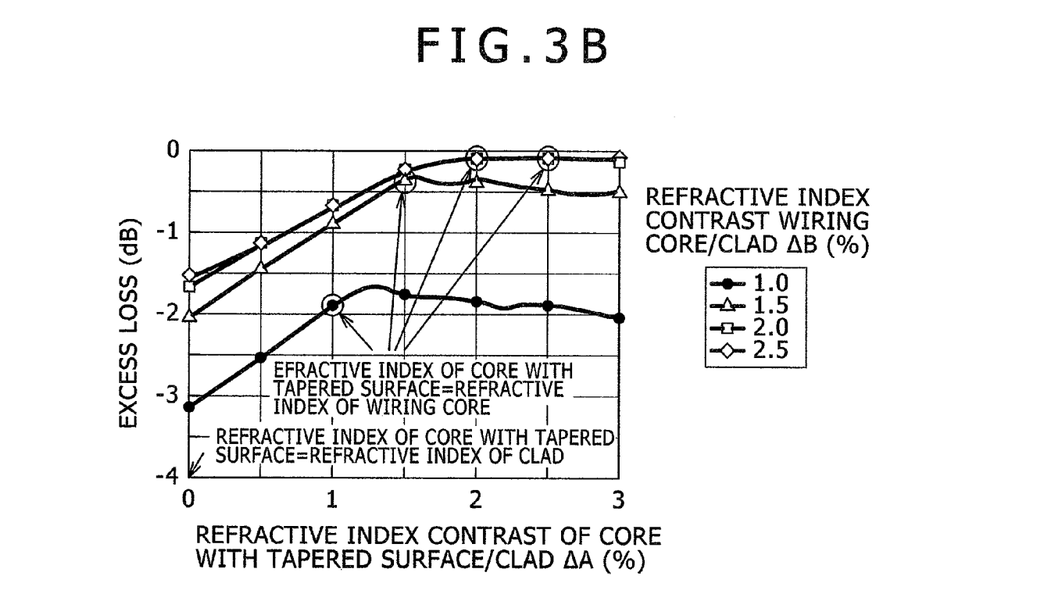
FIG. 3B is a view illustrating the relationship between the excess loss of the light propagating through the core and the refractive index contrast AA between the core with the tapered surface and the clad according to a ray tracing method by using the model shown in FIG. 3A.

FIG. 3A is a view schematically illustrating an example in which light 30 is incident onto one surface of the core arranged on the clad 11, passes through the core 15 with the tapered surface, and then emitted from the other surface of the core 13. FIG. 3B is a view illustrating the relationship between the excess loss of the light propagating through the core (intensity of incident light 30−intensity of exiting light 31) and the refractive index contrast αA between the core with the tapered surface and the clad 11 according to a ray tracing method by using the model shown in FIG. 3A. As described above, the core 13 has a cross section of 50 μm×50 μm, and the clad covering the core is 25 μm thick. The material loss caused when the light propagates through the core 13 is not considered. Further, a dependency was also calculated when a refractive index contrast ΔB between the core 13 and the clad 11 was changed from 1.0 to 2.5. As can be seen from the result shown in FIG. 3B, in a case where ΔA is 0%, i.e. the refractive indexes of the core 15 with the tapered surface and the clad 11 are identical to each other, the light propagating through the core 13 is radiated upon passing through the core 15 with the tapered surface, thereby causing excessive loss due to leaking light. To counteract this, the refractive index of the core 15 with the tapered surface is adapted to be larger than that of the clad layer 11. That is, enlarging ΔA allows suppresses excess loss caused by the leaking light since the light propagating through the core 13 is trapped due to the refractive index contrast between the core 15 with the tapered surface and the clad 11 upon passing through the core 15 with the tapered surface. As can be seen from the result shown in FIG. 3B, it is sufficient to make the refractive index of the core 15 with the tapered surface identical to or more than that of the core 13 so as to accomplish the excess loss effects. From the point of view of the suppression of excess loss, it is effective to configure the structure of the present invention to establish the following relationship when it assumed that n1 refers to the refractive index of the clad 11, n2 to the refractive index of the wiring core 13, and n3 to the refractive index of the core 15 with the tapered surface: n1<n2≦n3.

Second Embodiment

Figure 4A:
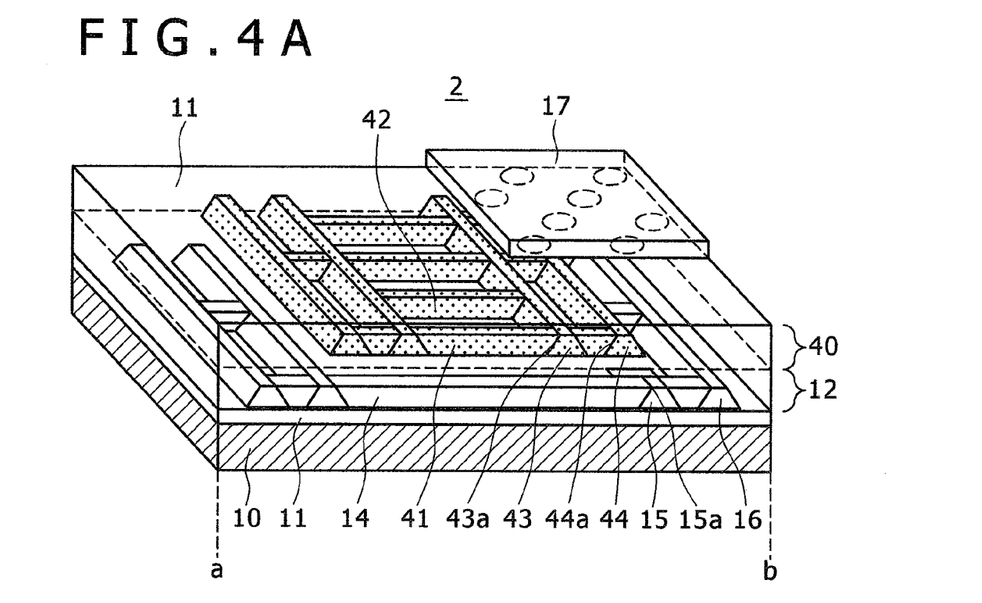
FIGS. 4A and 4B are a perspective view and a plan view respectively illustrating a photoelectric hybrid circuit-mounted substrate 2 according to a second embodiment of the present invention.
Figure 4B:
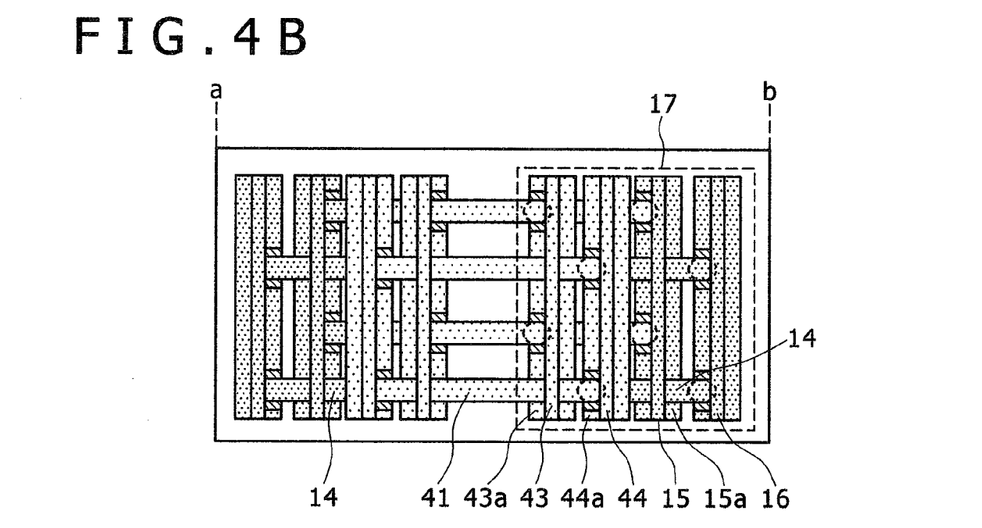

FIG. 4A,B is a perspective view and a plan view respectively illustrating a photoelectric hybrid circuit-mounted substrate 2 according to a second embodiment of the present invention. In the example shown in FIG. 4A,B, the structure of the photoelectric hybrid circuit-mounted substrate 1 shown in the first embodiment is stacked in double layers. Referring to FIG. 4A,B, a core 41 whose optical path is turned by a tapered surface 43a of a core 43 with the tapered surface and a core 42 whose optical path passes through the core 43 with the tapered surface and is turned by a tapered surface 44a of a core 44 with the tapered surface are alternately arranged in an optical waveguide layer 40 similarly to the structure of the photoelectric hybrid circuit-mounted substrate 1. The optical waveguide layer 40 is arranged on the optical waveguide layer 12 in the thickness direction. And optical element arrays 17 are positioned on the surface of the optical waveguide layer 40 to correspond to the tapered surfaces of the cores with the tapered surfaces that are arranged in each of the optical waveguide layers 40 and 12. Further, this structure is formed by repeating the fabrication procedure described above with reference to FIGS. 2A to 2F. Even though the two-layer structure has been exemplified in FIG. 4A,B, the same fabrication procedure and the same wiring configurations may also be applied when laminating the structure in triple layers or more. It is possible to obtain high-density wiring in a smaller area by laminating multiple optical waveguide layers, each having wiring cores arranged alternately therein, similarly to the same structure.

Third Embodiment

Figure 5:
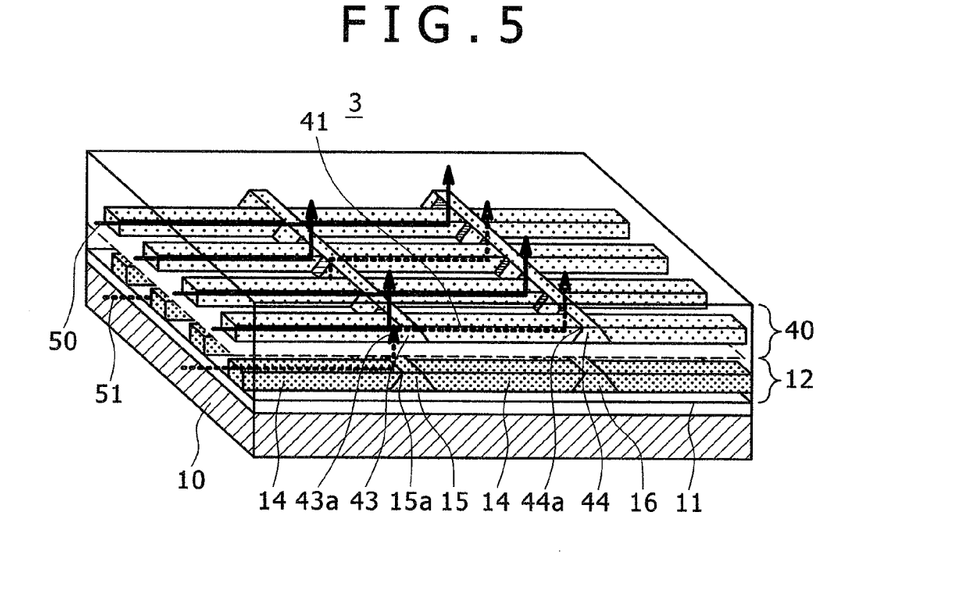
FIG. 5 is a perspective view illustrating a photoelectric hybrid circuit-mounted substrate 3 according to a third embodiment of the present invention.

FIG. 5 is a perspective view illustrating a photoelectric hybrid circuit-mounted substrate 3 according to a third embodiment of the present invention. In this embodiment, the cores 15 and 16 with the tapered surfaces included in the optical waveguide layer 12 are arranged immediately under the cores 43 and 44 with the tapered surfaces included in the optical waveguide layer 40 in the two-layer lamination structure of the photoelectric hybrid circuit mounting substrate 2 according to the second embodiment. Referring to FIG. 5, light propagating through the core 14 in the optical waveguide layer 12, which is indicated by dotted lines in FIG. 5, turns its optical path upwardly from the substrate by the tapered surface 15a of the core 15 with the tapered surface, passes through the core 43 with the tapered surface included in the optical waveguide layer 40, and then turns the optical path in parallel with the substrate by the tapered surface 43a. The light whose optical path has been further turned propagates through the core 41 and then turns the optical path upwardly from the substrate by the tapered surface 44a of the core 44 with the tapered surface to be optically connected to optical element arrays (not shown) positioned on the substrate. This structure enables the propagation direction of light to be freely changed by the cores with the tapered surfaces in spite of multiple layers stacked over one another, and thus allowing flexibility in wiring lay-outs.

Fourth Embodiment

Figure 6:
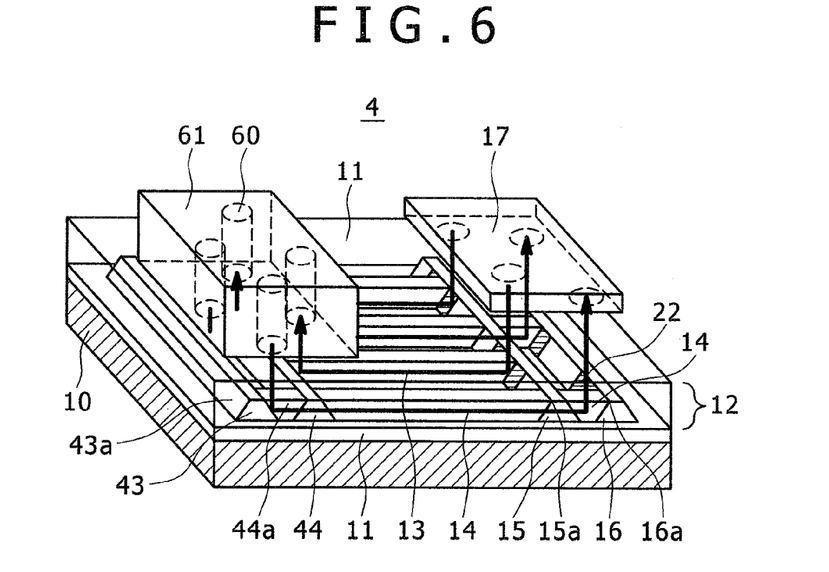
FIG. 6 is a perspective view illustrating a photoelectric hybrid circuit-mounted substrate 4 according to a fourth embodiment of the present invention.

FIG. 6 is a perspective view illustrating a photoelectric hybrid circuit-mounted substrate 4 according to a fourth embodiment of the present invention. In this embodiment, an optical connector 61 is positioned on the optical waveguide layer 12 included in the photoelectric hybrid circuit-mounted substrate 1 according to the first embodiment. The optical connector 61 has several fibers 60 that are located to be opposite to the optical element arrays 17 through the cores 13 and 14. Light emitted to the tapered surface 43a of the core 43 with the tapered surface or tapered surface 44a of the core 44 with the tapered surface from the fibers 60 turns its optical path in the direction parallel with the substrate by the tapered surfaces 43a and 44a and then propagates through the cores 13 and 14 by positioning the optical connector 61 which integrally includes the fibers 60, which are arranged alternately to each other like the wiring cores 13 and 14, on the clad layer 11 which is arranged immediately over the cores 43 and 44 with the tapered surfaces that are included in the optical waveguide layer 12. Further, the light propagating through the cores 13 and 14 turns its optical path upwardly from the substrate by the tapered surface 15a of the core 15 with the tapered surface or the tapered surface 16a of the core 16 with the tapered surface, and is simultaneously optically connected to the optical element arrays 17. In addition, although it has been exemplified that the light emitted from the fibers 60 is incident onto the optical element arrays 17 through the optical waveguide layer 12, it may also be implemented for the light emitted from the optical element arrays 17 to be incident onto the fibers 60 through the optical waveguide layer 12 according to the same structure. In this case, the optical element arrays 17 are configured as surface emitting laser diodes or surface receiving photo diodes. Further, the above-mentioned alternate arrangement of the fibers 60 may be made by alternately forming V-shaped grooves between the layers for installing the fibers in the optical connector 61. This structure enables, for example, optical signals inputted/outputted to/from the outside of the photoelectric hybrid circuit-mounted substrate 4 through the fibers 60 to be transmitted to the optical element arrays 17. Further, although not shown, the same optical element arrays as the optical element arrays 17 may be further provided on the optical waveguide layer 12 to be opposite to the optical element arrays 17 through the cores 13 and 14, and this structure allows for transmission of optical signals between the elements.

Fifth Embodiment

Figure 7:
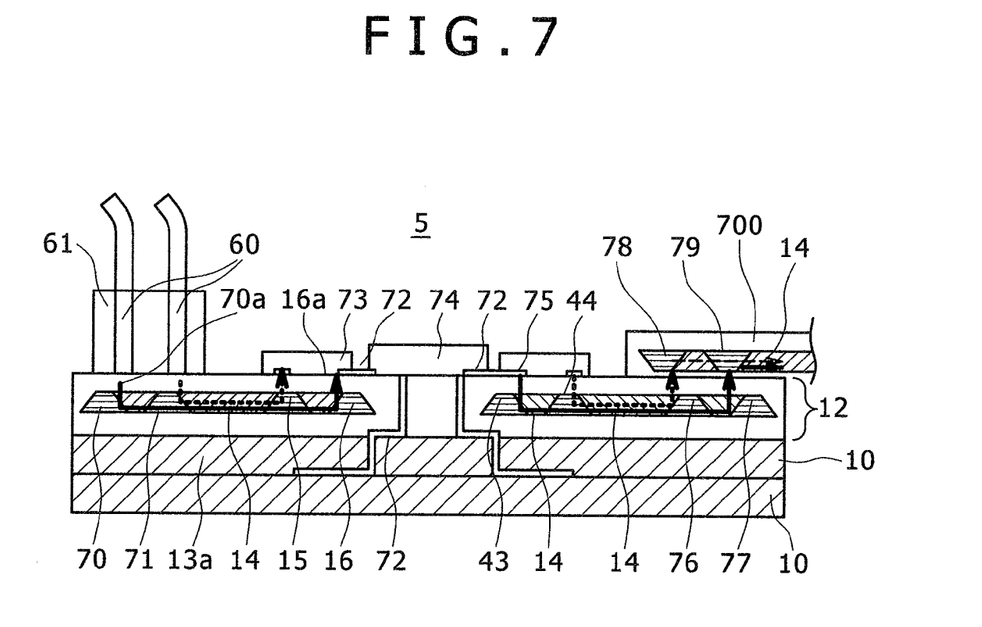
FIG. 7 is a cross section view illustrating a photoelectric hybrid circuit-mounted substrate according to a fifth embodiment of the present invention.

FIG. 7 is a cross section view illustrating a photoelectric hybrid circuit-mounted substrate according to a fifth embodiment of the present invention. As shown in FIG. 7, the optical waveguide layer 12 having the structure according to the present invention is formed on the substrate 10, and a light receiving array 73 is positioned on the optical waveguide layer 12, wherein light emitted from the fibers 60 integrated in the optical connector 61 is incident onto the light receiving array 73 through the cores 70 and 71 with the tapered surfaces, the core 14, and the cores 15 and 16 with the tapered surfaces. Likewise, a light emitting element array 73 for transferring optical signals through the cores 43 and 44 with the tapered surfaces, the core 14, and the cores 76 and 77 with the tapered surfaces and an optical connector 700 having the cores 78 and 79 with the tapered surfaces and the core 14 therein are positioned on the optical waveguide layer 12. Further, an integrated circuit 74 is arranged on the optical waveguide layer 12 adjacently to the light receiving element array 73 and the light receiving element array 73. The integrated circuit 74 includes a circuit for driving each optical element array, a cross bar switch, a logic circuit, or the like. Further, although not shown, each optical element array and the integrated circuit 74 are connected to each other by high frequency electrical wiring formed on the optical waveguide layer. Furthermore, electrical interconnects 72 for a power source, a ground, and the like of the integrated circuit 74 are connected to the substrate 10 through the optical waveguide layer 12. According to this structure, light transmitted from the outside of the substrate through the fibers 60 to the optical waveguide layer 12 is turned into an electrical signal by the light receiving element array 73, and the electrical signal is processed by the integrated circuit 74. The processed electrical signal is turned back to an optical signal by the light emitting element array 74 and then transmitted to the outside of the substrate through the optical waveguide layer 12, and the cores 78 and 79 with the tapered surfaces and the core 14 included in the optical connector 700. Further, the structure according to the present invention enables a high-density photoelectric hybrid circuit to be achieved with a smaller mounting area.

Sixth Embodiment

Figure 8:
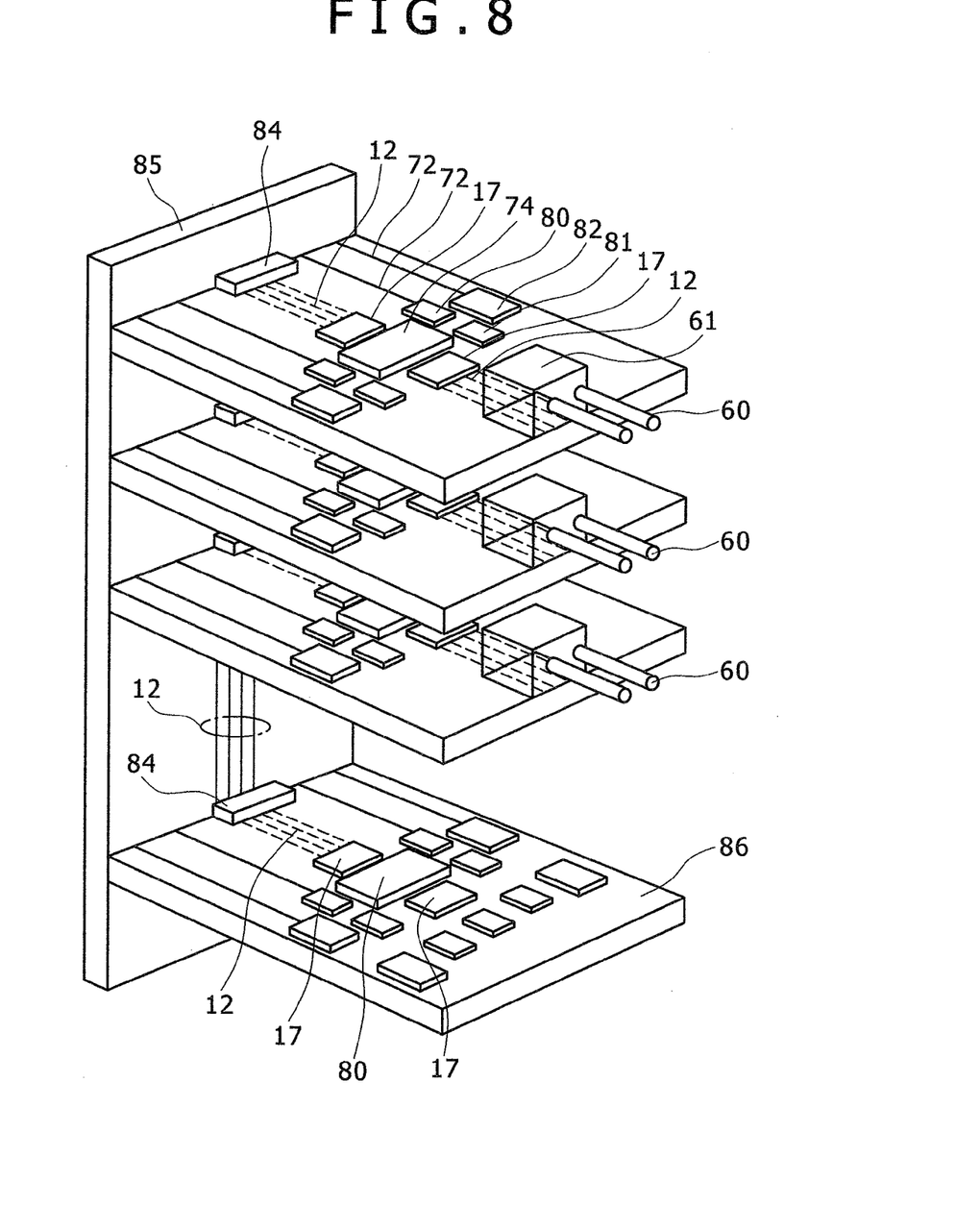
FIG. 8 is a view schematically illustrating an application of the photoelectric hybrid circuit-mounted substrate of the present invention according to a sixth embodiment.

FIG. 8 is a view schematically illustrating an application of the photoelectric hybrid circuit-mounted substrate of the present invention according to a sixth embodiment. In this embodiment, there is shown an example of applying the photoelectric hybrid circuit-mounted substrate described according to the fifth embodiment to the daughter board 83 that is connected to the back plane 90. Referring to FIG. 8, for example, function Ethernet to be transmitted to the outside of the substrate is transmitted from the front of the board through the fibers 60 to the optical waveguide layer 12, and turned into an electrical signal by the optical element arrays 17. The turned electrical signal is processed by the integrated circuit 74, and the processed electrical signal is turned back to an optical signal by the optical element arrays 17. Then, the turned optical signal is optically connected to the optical connector 84 located in the back plane side through the optical waveguide layer 12. Besides, optical signals from the daughter boards 83 are gathered into the switch card 86 through the optical lines 12. Further, the signal that is optically connected to the optical element arrays 17 through the optical waveguide layer 12 arranged on the switch card and processed by the integrated circuit 74 is inputted/outputted to/from each daughter board 83 through the optical element arrays 17.

INDUSTRIAL APPLICABILITY

It is possible to provide a substrate mounted with a photoelectric hybrid circuit that has an optical path conversion mirror structure and optical waveguide wiring that may reduce the number of parts and the number of fabrication steps to save costs, as well as most effectively implement high-density wiring for an optical connection between the optical waveguide and the photoelectric conversion element or optical waveguide array connector that are formed on the substrate, and a device using the substrate mounted with the photoelectric hybrid circuit.

EXPLANATION OF REFERENCE NUMERALS AND SYMBOLS 1, 2, 3, 4, 5 . . . SUBSTRATE MOUNTING PHOTOELECTRIC HYBRID CIRCUIT
10 . . . SUBSTRATE
11 . . . CLAD
12, 40 . . . OPTICAL WAVEGUIDE LAYER
13, 14, 20, 41, 42 . . . CORE
15, 16, 43, 44, 70, 71, 76, 77, 78, 79 . . . CORE WITH TAPERED SURFACE
15A, 16A . . . TAPER SURFACE
17 . . . OPTICAL ELEMENT ARRAY
21 . . . SOLDERING BUMP
22, 23 . . . OPTICAL REFLECTING FILM
30, 50, 51 . . . INCIDENT LIGHT
31 . . . EXITING LIGHT
60 . . . FIBER
61, 84, 700 . . . OPTICAL CONNECTOR
72 . . . ELECTRICAL INTERCONNECT
73 . . . LIGHT RECEIVING ARRAY
74 . . . INTEGRATED CIRCUIT
75 . . . LIGHT EMITTING DEVICE ARRAY
80, 81, 82 . . . ELECTRONIC CIRCUIT

83 ... DAUGHTER BOARD
85 ... BACKPLANE
86 ... SWITCH CARD
100 ... ARRAY TYPE PHOTOELECTRIC CONVERSION ELEMENT UNIT
101A, 101B ... ARRAY TYPE OPTICAL WAVEGUIDE UNIT
104A, 104B ... OPTICAL WAVEGUIDE UNIT FOR ARRAY TYPE OPTICAL COUPLING
105 ... CORE (OPTICAL WAVEGUIDE FOR OPTICAL COUPLING)
107 ... SECTION OF OPTICAL WAVEGUIDE
111 ... CLAD
112 ... PHOTOELECTRIC CONVERSION ELEMENT ARRAY

The invention claimed is:

1. An optical waveguide substrate comprising:
a substrate;
a clad layer stacked on the substrate;
at least a pair of first cores with tapered surfaces, each having at least one tapered surface in a longitudinal direction, the first cores being formed on the clad layer; and
a wiring core formed on the clad layer,
wherein a predetermined area of the tapered surface has a reflecting part with a reflecting surface that turns the optical path of incident light in a desired direction and a light transmission part in which incident light propagating in the wiring core and reaching the tapered surface further travels in its propagation direction and passes through the first core with the tapered surface, and
wherein the wiring core is arranged to intersect at the reflecting part and the light transmission part.

2. The optical waveguide substrate according to claim 1, further comprising:
at least a pair of second cores with tapered surfaces, each of the second cores with tapered surfaces being formed on the clad layer in parallel with each of the first cores with tapered surfaces,
wherein each of the first cores with tapered surfaces that face the second cores with tapered surfaces is arranged between the second cores with tapered surfaces, and
wherein a second reflecting part is formed on a tapered surface where the wiring core extending from the light transmission part to the second core with tapered surface intersects the second core with tapered surface to turn the path of the incident light in a desired direction.

3. The optical waveguide substrate according to claim 2, wherein assuming that n1 refers to the refractive index of the clad layer, n2 refers to the refractive index of the wiring core, and n3 refers to the refractive index of the first and second cores with tapered surfaces, the following relationship is established: $n1 < n2 \leq n3$.

4. The optical waveguide substrate according to claim 2, wherein each of the first and second cores with tapered surfaces is formed of a single continuous body.

5. The optical waveguide substrate according to claim 2, wherein each of the first and second reflecting parts is formed of a metallic material.

6. The optical waveguide substrate according to claim 2, wherein each of the wiring core, the clad layer, and the first and second cores with tapered surfaces is formed of a photosensitive polymer material.

7. The optical waveguide substrate according to claim 2, wherein the tapered surfaces are formed on both sides of each of the first and second cores with tapered surfaces.

8. The optical waveguide substrate according to claim 2, wherein optical element arrays are arranged on the first and second cores with tapered surfaces,
wherein light propagating through the wiring core is transmitted/received to/from the optical element through the first reflecting part or the second reflecting part.

9. The optical waveguide substrate according to claim 8, wherein the optical element arrays consist of surface emitting laser diodes or surface receiving photo diodes.

10. The optical waveguide substrate according to claim 8, wherein the optical element arrays are constituted of optical fibers having a connector.

11. An optical waveguide substrate comprising:
a first optical waveguide layer including a first clad layer formed on a substrate and a first wiring core formed on the first clad layer and propagating incident light;
a second optical waveguide layer including a second clad layer formed on the first optical waveguide layer and a second wiring core formed on the second clad layer and propagating incident light; and
at least a pair of first cores with tapered surfaces arranged to intersect the first and second wiring cores, respectively, each of the first and second cores with tapered surfaces having at least one tapered surface in a longitudinal direction,
wherein the tapered surface of the first core with tapered surface and the tapered surface of the second core with tapered surface have a first reflecting part and a second reflecting part, respectively, and a first light transmission part and a second transmission part, respectively, each of the first and second reflecting parts having a reflecting surface that turns the path of incident light in a desired direction,
wherein in each of the first and second light transmission parts, incident light propagating in the first and second wiring cores and reaching the tapered surface further travels in its propagation direction and passes through the first and second cores with tapered surfaced,
wherein the first and second wiring cores are arranged to intersect at the first and second reflecting parts and at the first and second light transmission parts, respectively, and further comprising,
at least pair of third cores with tapered surfaces which are formed on the first clad layer in parallel with the first cores with tapered surfaces, and at least pair of fourth cores with tapered surfaces which are formed on the second clad layer in parallel with the second cores with tapered surfaces,
wherein each of the first cores with tapered surfaces is arranged between the opposite third cores with tapered surfaces that face the first cores with tapered surfaces,
wherein each of the second cores with tapered surfaces is arranged between the opposite fourth cores with tapered surfaces,
wherein a third reflecting part is formed on a tapered surface where a third wiring core extending from the first light transmission part to the third core with tapered surface intersects the third core with tapered surface to turn the path of the incident light in a desired direction, and
wherein a fourth reflecting part is formed on a tapered surface where a fourth wiring core extending from the second light transmission part to the fourth core with tapered surface intersects the fourth core with tapered surface to turn the path of the incident light in a desired direction.

12. The optical waveguide substrate according to claim 11, wherein assuming that n1 refers to the refractive index of the first and second clad layers, n2 refers to the refractive index of the first and second wiring cores, and n3 refers to the refractive index of the first to fourth cores with tapered surfaces, the following relationship is established: n1<n≦n3.

13. The optical waveguide substrate according to claim 11, wherein each of the first to fourth cores with tapered surfaces is formed of a single continuous body.

14. The optical waveguide substrate according to claim 11, wherein each of the first to fourth reflecting parts are formed of a metallic material.

15. The optical waveguide substrate according to claim 11, wherein each of the first and second wiring cores, the first and second clad layers, and the first to fourth cores with tapered surfaces is formed of a photosensitive polymer material.

16. The optical waveguide substrate according to claim 11, wherein the tapered surfaces are formed on both sides of each of the first to fourth cores with tapered surfaces.

17. The optical waveguide substrate according to claim 11, further comprising: optical element arrays arranged over the first to fourth reflecting parts and on the third clad layer which is formed on the second optical waveguide layer,
wherein light propagating through the first core with tapered surface passes through the first reflecting part or the first light transmission part and turns its path by the third reflecting part to be transmitted/received to/from the optical element arrays, or light propagating through the second core with tapered surface through the first and second reflecting parts is transmitted/received to/from the optical element arrays.

18. The optical waveguide substrate according to claim 17, wherein the optical element arrays consist of surface emitting laser diodes or surface receiving photo diodes.

19. The optical waveguide substrate according to claim 17, wherein the optical element arrays are constituted of optical fibers with a connector.

20. The optical waveguide substrate according to claim 11, further comprising:
another optical waveguide layer stacked on the second optical waveguide layer through a clad layer in multi layers in the thickness direction of the substrate,
wherein optical element arrays are positioned on the surface of the topmost layer of the optical waveguide layers stacked in multi layers to correspond to the tapered surfaces of the cores with tapered surfaces, respectively, which are provided in the optical waveguide layers, and
wherein light is transmitted and received between the wiring core and the optical element arrays through the cores with tapered surfaces.

21. A substrate mounting a photoelectric hybrid circuit comprising:
a plurality of optical waveguide layers including a clad layer formed on a substrate and a core with a tapered surface formed on a the clad layer, the core having a tapered surface in at least a tapered surface in a longitudinal direction;
a wiring core formed on the clad and having a reflecting part and a light transmission part in a predetermined area on the tapered surface, wherein the reflecting part has a reflecting surface that turns the path of incident light in a desired direction and in the light transmission part, incident light propagating in the wiring core and reaching the tapered surface further propagates in its propagation direction and passes through the core with tapered surface, the wiring intersecting at the reflecting part and the light transmission part;
a light receiving element, a light emitting element, and an integrated circuit element formed on the optical waveguide layer;
an electrical line formed on the substrate to supply power to the integrated circuit element;
an input-sided optical connector having an optical fiber that introduces incident light to one of the plurality of optical waveguide layers; and
an output-sided optical connector having the core with tapered surface, the output-sided optical connector being formed on the optical waveguide layers and outputting light from another one of the plurality of optical waveguide layers,
wherein the light receiving element receives the incident light from one of the plurality of optical waveguide layers and transmits an electrical signal corresponding to the incident light to the integrated circuit element, and
wherein the light emitting element supplies an optical signal to another one of the plurality of optical waveguide layers in response to the electrical signal transmitted from the integrated circuit element and transmits the optical signal to the outside through the output-sided optical connector.

22. The substrate mounting the photoelectric hybrid circuit according to 21, comprising:
at least two-layer optical waveguide layers formed by alternately laminating the optical waveguide layer and the clad layer on the substrate,
wherein a light receiving element, a light emitting element, and an integrated circuit element are prepared on the surface of the topmost layer of the stacked optical waveguide layers.

* * * * *